US007468974B1

(12) United States Patent
Carr et al.

(10) Patent No.: US 7,468,974 B1
(45) Date of Patent: Dec. 23, 2008

(54) EFFICIENT STRICTLY NON-BLOCKING MULTICAST SWITCH ARCHITECTURE FOR TIME DIVISION MULTIPLEXED TRAFFIC

(75) Inventors: Larrie Simon Carr, Anmore (CA); Winston Ki-Cheong Mok, Vancouver (CA); Kenneth Evert Sailor, Saskatoon (CA)

(73) Assignee: PMC-Sierra, Inc., Santa Clara, CA (US)

( * ) Notice: Subject to any disclaimer, the term of this patent is extended or adjusted under 35 U.S.C. 154(b) by 762 days.

(21) Appl. No.: 10/946,178

(22) Filed: Sep. 22, 2004

Related U.S. Application Data

(60) Provisional application No. 60/503,898, filed on Sep. 22, 2003.

(51) Int. Cl.
*H04Q 11/00* (2006.01)
(52) U.S. Cl. .................. 370/388; 370/390; 370/442
(58) Field of Classification Search ........... None
See application file for complete search history.

(56) References Cited

U.S. PATENT DOCUMENTS

| | | | |
|---|---|---|---|
| 5,119,368 A | | 6/1992 | Hiltner et al. |
| 5,469,154 A | | 11/1995 | Karp |
| 5,933,428 A | * | 8/1999 | Olnowich .................. 370/388 |
| 5,991,270 A | * | 11/1999 | Zwan et al. ................. 370/249 |
| 7,257,127 B1 | * | 8/2007 | Cankaya .................... 370/459 |
| 2002/0001305 A1 | * | 1/2002 | Hughes et al. ............... 370/369 |
| 2003/0021267 A1 | * | 1/2003 | Wu et al. ................... 370/388 |
| 2004/0056757 A1 | * | 3/2004 | Konda ....................... 340/2.22 |

OTHER PUBLICATIONS

Clos, "A Study of Non-Blocking Switching Networks", *The Bell System Technical Journal*, vol. 32, 1953, pp. 406-424.
Yang et al., "The Necessary Conditions for Clos-Type Nonblocking Multicast Networks", *IEEE Transactions on Computers*, vol. 48, No. 11, 1999, pp. 1214-1227.
Hui, Chapter 3, "Point-to-Point Multi-Stage Circuit Switching", *Switching and Traffic Theory For Integrated Broadband Networks*, pp. 54-83.

\* cited by examiner

*Primary Examiner*—Hassan Kizou
*Assistant Examiner*—Jeffrey M Rutkowski
(74) *Attorney, Agent, or Firm*—Curtis B. Behmann; Borden Ladner Garvais LLP

(57) ABSTRACT

A Forward Propagation Architecture is a novel switch architecture based on well-known unicast switching architectures, and provides two desirable properties: (1) no rearrangement of established calls is ever required and (2) the architecture is strictly non-blocking for multicast, even when multicast destinations are dynamically added to existing calls. These properties (excluding dynamic multicast destination addition) can be provided by standard architectures or Time:Space:Time architectures with speedup proportional to the width of the widest multicast to be supported. The speedup required by the FPA is constant and practical (approximately 4× speedup) and at significantly less hardware cost than $n^2$ architectures. The key to the FPA's capability is a sequentially doubled fabric with a feedback loop. The FPA requires a routing algorithm for connection setting. The connection-setting algorithm is sufficiently simple to be implemented in hardware.

35 Claims, 10 Drawing Sheets

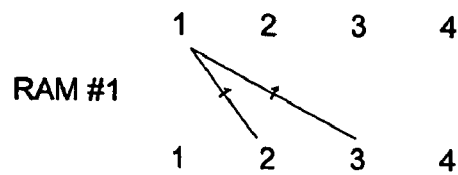
FIG. 6
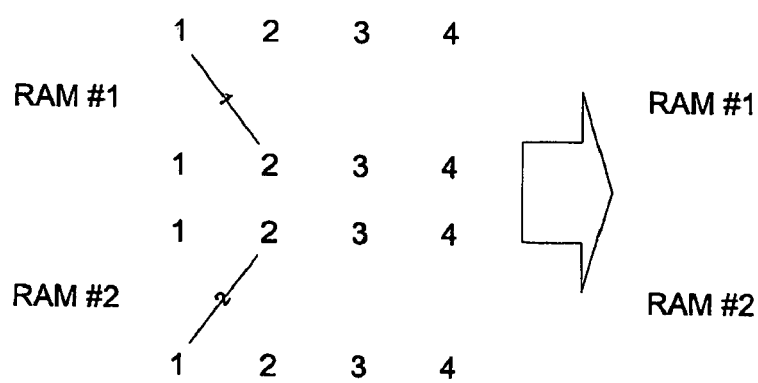 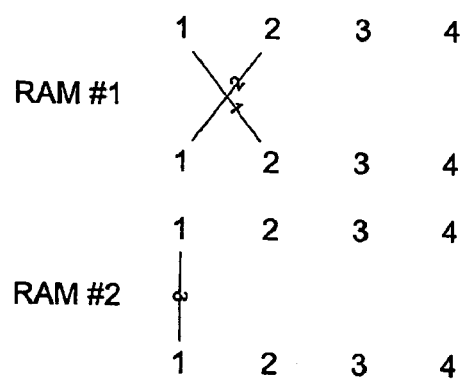
FIG. 7A  FIG. 7B

```
linearSearchPingRam( inputTime, outputTime)
    i ← 1
    while ( i <= MaxRAM )
       if RAMisFree( i, outputTime ) and
             PingInputMuxIsFree( i, inputTime ) then
          return i
       end if
       incr i
    end while
    (impossible to get here)
end
```

FIG. 11

```
linearSearchPongRam( prevTime, newTime)
    i ← 1
    while ( i <= MaxRAM )
       if RAMisFree( i, newTime ) and
             PongRecircMuxisFree( i, prevTime ) then
          return i
       end if
       incr i
    end while
    (impossible to get here)
end
```

FIG. 12

```
addNewCall ( call )
    // find ram location for first output
    call.ram[1] ← linearSearchPingRam( call.inputTime, call.outputTime[1]
    ram[call.ram[1],call.outputTime[1]] ← call
    pingInputMux[call.ram[1], call.inputTime] call.inputPort
    pongOutputMux[call.ouputPort[1], call.outputTime[1]] ← call.ram[1]

i ← 2
    while ( i <= call.maxOutput )
        if ( call.outputTime[i-1] == call.outputTime[i] ) then
           call.ram[i] ← call.ram[i-1]
        else
           call.ram[i] ←
              linearSearchPongRam(call.outputTime[i-1],call.outputTime[i])
           pongRecircMux[call.ram[i],call.outputTime[i-1]] ← call.ram[i-1]
           ram[call.ram[i],call.outputTime[i]] ← call
        end if
        pongOutputMux[call.outputPort[i],call.outputTime[i]] call.ram[i]
        increment i end while
end callAdd
```

FIG. 13

EFFICIENT STRICTLY NON-BLOCKING MULTICAST SWITCH ARCHITECTURE FOR TIME DIVISION MULTIPLEXED TRAFFIC

CROSS REFERENCE TO RELATED APPLICATIONS

This application claims the benefit of U.S. Provisional Application No. 60/503,898, filed Sep. 22, 2003, which is incorporated herein by reference.

FIELD OF THE INVENTION

The present invention relates generally to time division multiplexed traffic, such as in high bandwidth devices as the basis for switch devices. More particularly, the present invention relates to multicast switching of time division multiplexed traffic.

BACKGROUND OF THE INVENTION

Time division multiplexing (TDM) is a standard technique for aggregating independent data channels.

FIG. 1 shows a graphical view of aligned TDM channels for links A, . . . , n ready for switching. In a TDM channel, data is multiplexed (or muxed) according to location in time. Each port in a system must be aligned to some signal. In SONET, the alignment signal is an 8 kHz clock and start of frame. A stream within a channel is identified by its offset from the signal, with individual datum recurring every G clock ticks. The grainsize G defines the granularity of switching possible in a particular TDM system. In FIG. 1, each stream is labelled with a subscript to identify byte ordering within individual data channels.

FIG. 2 shows a graphical view of one of the problems associated with TDM switching. In general, a switch can be any number of inputs to any number of outputs. For simplicity, only switches of the same number of input and output ports are considered in this discussion but the concepts can be easily extended to asymmetrical switches of various numbers of input and output ports. Similarly, switches are often homogenous in terms of grain size, but grain size also may vary per port. In any case, the switch must perform buffering necessary to align data, and typically the buffering is related to the grainsize. In FIG. 2, bytes are labelled with a letter representing the input port and a number representing the byte position at the port. As can be seen in the output streams, bytes may be reordered to any position within a grain group, may be multicast to several ports (or a single port), and bytes may be dropped.

There are many known techniques for TDM switch architectures having different capabilities and costs. Perhaps the most obvious switch capable of connecting N input ports with N output ports is an N×N crossbar of internal switches or crosspoints. Given such a switching matrix, any output can be connected to any input through the setting of a single crosspoint switch regardless of other traffic on the switch. As N grows large, however, the number of internal switches becomes impractical since the number of internal switches is equal to the square of the number of inputs, and the number of inputs is the product of the number of ports times the grainsize. This style of switch is commonly referred to as an $n^2$ architecture or a memory switch.

FIG. 3 shows an $n^2$ architecture of a four-port crossbar switch. The blackened crosspoints of FIG. 3 represent switches set to connect data between horizontal and vertical wires. The rule for switch settings is that any row may have zero or more crosspoints set, but a column can set at most one crosspoint. Other $n^2$ architectures include multiplexers, or muxes, to select from all inputs at each output. The key to an $n^2$ architecture is that all outputs are available to all inputs, and this availability can only be provided by a cost based on the multiplicative product of the inputs and the outputs.

Charles Clos showed how an N port switch can be constructed as a three-stage network of smaller switches with substantially less cost than an $n^2$ architecture. This can be seen, for example, in C. Clos "A Study of Non-blocking Switching Networks", The Bell System Technical Journal, 1953, vol. 32, no. 2, pp. 406-424. A Clos network that is defined or described as v(m, n, r) has r switches of size n×m in stage 1, m switches of size r×r in stage 2, and r switches of size m×n in stage 3. When m=n, a rearrangeably non-blocking unicast network results where an algorithm is required to calculate switch settings and existing connections may need to be moved to make room for a new connection request Clos proved that when m≧2n−1, the resulting network does not require rearranging to satisfy any unicast request regardless of previous state, e.g. the network is strictly non-blocking for unicast. The cost of a Clos network measured in crosspoints is $2\,rmn+mr^2$ compared to $n^2r^2$ for a memory switch.

FIG. 4 shows an example Clos switch with n=m=r=4. If each of the 4×4 switches in the network is implemented as a crossbar architecture of 16 crosspoints, then the total number of crosspoints required by the network is 12*16 or 192 as predicted by the cost equation for Clos switches compared to the 256 required by the $n^2$ architecture. As the number of inputs grows, the hardware cost savings provided by the Clos network becomes more dramatic.

While unicast switches are useful, many applications require multicast. Active research has determined how much speedup is required to support multicast in crosspoint-reduced networks like Clos networks. Using reasoning similar to the proof of non-blocking unicast for Clos networks with 2× speedup and defining multicast as a single input being multicast to at most w outputs, then a Clos network with m=(w+1)n−w+1 will provide a strictly non-blocking switch supporting w-wide multicast.

With respect to terms used in this description, "blocking" occurs when a connection is made that can exclude the possibility of certain other connections being made. A switch is said to be "non-blocking" if any new connection request within the capacity of all input and output ports can be satisfied by the switch. A switch is said to be "wide sense non-blocking" when a particular connection rule must be applied in order to achieve a state in which a new connection can always be made. A switch is said to be "strict sense non-blocking" or "strictly non-blocking" when any connection rule can be applied to achieve a state in which a new connection can always be made without disturbing the existing connections. A switch is said to be "rearrangeably non-blocking" when a new connection can be made, but it might be necessary to reconfigure some other connections on the switch.

Given speedup of m=(w+1)n−w+1 within a Clos network and regardless of previously scheduled traffic, there is always capacity to schedule a connection between any set of outputs and an input assuming sufficient bandwidth at inputs and outputs. However, there is no guarantee even with this speedup that an existing multicast connection can have an arbitrary leaf added without rearrangement. A "leaf" is a terminal or bottom item of a tree, i.e., an item with no child; more formally, a leaf is a vertex with degree one, and can also be referred to as an external node, or as a terminal node. Even with the increased speedup, it may be necessary to delete and re-add the entire multicast connection in order to add a single leaf to the connection.

FIG. 5 shows an example Space:Time:Space switch. This switch has four ports A-D of four timeslots (e.g. n=4 and G=4). The input muxes 10 implement a space switch capable of writing one of the concurrently arriving bytes from any port into receiving, or "ping", RAMs 20. A receiving RAM 20 can write the data into any timeslot (byte location) but can only receive one byte at a time. For this reason, the receiving RAM 20 cannot receive data from two different ports arriving at the same time. When an entire grain group, G bytes from each port, has been received, the data is shifted into output, or pong, RAMs 30 to be read for output. Output muxes 40 (similar to the input muxes 10) feed the output ports and similar rules apply in that any output port can receive only one-byte at a time although each can receive a byte from any of the pong RAMs. Ping and pong RAMs 20 and 30 can be implemented in a variety of ways: for example, an additional selector on the mux can choose between the two sets of RAMs, and in that case whether a particular RAM is acting as a ping RAM or a pong RAM depends on the current setting of that selector. Two such sets of RAM are typically required since a byte of the following grain group may arrive before the previous grain group's contribution has been read out. This would happen, for example, with succeeding bytes of the D1 stream, since the arriving D1 byte of a following grain group would overwrite the preceding byte without the dual RAMs.

Switches like the Space:Time:Space example of FIG. 5 are equivalent to Clos networks. In fact, the switches of FIG. 4 and FIG. 5 are equivalent. The translation from a Space:Time:Space switch to a Clos network is achieved by: creating independent first stage switches to switch each column of data arriving at the Space:Time:Space switch; implementing center stage switches capable of doing the time rearrangement of the RAM writes and reads; and finally by providing output switches for each of the columns of output created by the Space:Time:Space output muxes. The Space:Time:Space network makes use of the arrival and departure time of bytes to reuse the muxes for each of the 4×4 switches pictured in the Clos network.

The Space:Time:Space switch of FIG. 5 has minimal internal buffering, or zero speedup, is rearrangeably non-blocking for unicast, and requires an algorithm to calculate grain placement in memory. The acceptance of a new call may require changing the placement of existing calls in the RAM (and therefore also changing the mux settings). The scheduling state of this switch may be captured in a data structure that describes the input and output requirements of each RAM.

Let a connection be described by the form Label:(Input Streams→Output Streams) or for example 1:(A1→B2,C3) indicating that connection 1 connects the input of port A grain 1 to output port B grain 2 and output port C grain 3. If this connection were scheduled for RAM #1 at time 1, this could be pictured as shown in FIG. 6, which illustrates a schedule of RAM #1 with connection 1:(A1→B2,C3). In the figure, the labels 1 through 4 across the top represent the arrival timeslots of the input. The labels 1 through 4 on the bottom represent the output departure times. Since the RAM is capable of receiving an input grain from any port, only the grain arrival time needs to be considered for scheduling. The call number that annotates the path from 1 to 2 and 3 can be used to determine the mux selector setting. The figure shows that RAM #1 is free to receive another input in timeslots 2, 3 and 4, and is capable of delivering other outputs in timeslots 1 and 4.

A property of such switches for unicast traffic only is that in any two RAMs where an input grain is unassigned in one RAM and an output is unassigned in the other RAM, the two RAM schedules can be rearranged to admit a connection between the input and output. FIG. 7A shows an initial scheduling of RAM #1 and RAM #2. In FIG. 7B, the previous scheduling of RAMs #1 and #2 of FIG. 7A are rearranged to allow a new connection 3. In other words, FIG. 7B illustrates the rearrangement required to add 3:(C1→D1) to the previous scheduling shown in FIG. 7A. Algorithms guaranteed to succeed in such rearrangement can be found in the prior art, such as in J. Hui, Switching and Traffic Theory for Integrated Broadband Networks, Kluwer Academic Publishers, 1990, Chapter 3, pp. 53-84.

Multicast significantly complicates connection scheduling for two reasons: first, some loads are inherently blocking and can not be scheduled; second, even when the capability to carry the multicast exists, the problem of efficiently finding the schedule is NP hard or currently believed to require time exponential in the size of the input and is only practical for small switches. A problem is described with respect to computational complexity as being "NP hard" if solving it in polynomial time would make it possible to solve all problems in class NP (nondeterministic polynomial time) in polynomial time.

To see why Space:Time:Space switches and equivalent Clos networks are blocking for multicast, consider the connection requests of 1:(A1→A1,B2), 2:(B1→B1,C3), 3:(C1→B2,A3), 4:(D1→A2,C1) and 5:(A2→D1,B3). The scheduling of the first four requests, which are conflicting multicast connections, is shown in FIG. 8. It is impossible to schedule connection 5 in a single RAM since the new connection's outputs conflict with every other connection, and other traffic arriving in grain 2 make it impossible to multicast connection 5 through the input stage muxes.

Multicast capability is typically provided to switches of this kind through additional switch capacity. For example, a fifth RAM would provide capacity for scheduling connection 5 from the example above. Such additional capacity is called "speedup". Sufficient speedup can change a rearrangeably non-blocking switch for unicast to a strictly non-blocking switch for unicast, and even greater speedup will make a switch strictly non-blocking for various widths of multicast.

To see why, consider a Space:Time:Space switch with 2n−1 RAMs and imagine scheduling the last connection of a 100% unicast load. There are n−1 RAMs receiving inputs at that grain time since there are n ports in the system. Likewise there are n−1 RAMs being read for output at the output grain time. If there is no overlap between the two sets of RAMs, then 2n−2 RAMs are unable to schedule this last connection, but this leaves at least one RAM guaranteed to be unscheduled for both the input and output grain. Therefore, with 2n−1 RAMs a Space:Time:Space switch is strictly non-blocking for unicast and will never require rearrangement. This is Clos's standard result for Clos networks applied to the RAM implementation of Space:Time:Space switches like that of FIG. 5.

Similarly, consider scheduling another 100% load comprised of both unicast and 2-cast connections and consider the last connection, a 2-cast request. In this case, at most n−1 RAMs can be receiving inputs. The hard case for the outputs is to assume different delivery times since a single delivery time could be serviced by a single RAM location. Therefore, assuming different delivery times for the outputs, n−1 RAMs may be delivering to the first output time and a second set of n−1 RAMs may be delivering to the second output time. If there is no overlap between the outputs and input, then as many as 3n−3 RAMs may be unavailable to schedule the request. This means that a switch with speedup of 3n−2 is sufficient for strictly non-blocking unicast and 2-cast. More generally, wn+n−w−1 speedup is sufficient for a non-rearrangeably non-blocking switch where w is the maximum width of multicast and n is the number of ports. Non-rearranging switches significantly simplify switch control. Rearranging switches require careful coordination to ensure no loss of data on rearrangement of active connections.

The problem with the speedup required to provide non-rearrangeably non-blocking switches through speedup is that the hardware cost to support multicast quickly eliminates any advantage that Space:Time:Space switches or Clos networks provide over switch architectures.

A second approach to providing hardware reduced multicast capability is to use some speedup less than that required for non-rearrangeably non-blocking switches and combine that with a more complicated switch setting algorithm. Under certain cases, the switch setting algorithm can guarantee that no requested connection will ever be rejected. This is known as "wide-sense" non-blocking. These solutions are all inherently rearranging.

Current state of the art for multicast switch architectures is represented by the following public domain publications, each of which is incorporated by reference in its entirety: C. Clos, "A study of non-blocking switching networks", Bell System Technical Journal, vol. 32, pp. 406-424, March 1953; Y. Yang and G. Masson, "The necessary conditions for Clos-Type nonblocking multicast networks", IEEE Transactions on Computers, Vol. 48, No. 11, November 1999; U.S. Pat. No. 5,119,368, "High-Speed Time-Division Switching System", issued on Jun. 2, 1992 to Hiltner et al.; U.S. Pat. No. 5,469,154, "Multiconnection switching networks", issued on Nov. 21, 1995 to Karp; and J. Hui, Switching and Traffic Theory for Integrated Broadband Networks, Kluwer Academic Publishers, 1990, Chapter 3. pp. 53-84.

Yang and Masson work towards a theoretical bound on speedup required for rearrangably non-blocking multicast in strict Clos networks. They are successful in finding a bound for such networks based on control algorithms where m=cn (log r)/(log log r), where c is "a small constant". This solution is inherently rearranging.

U.S. Pat. No. 5,119,368 solves the problem of multicast using speedup to create an N×N solution to handle TDM switching of arbitrary grain size. Given n ports of G grains each, the G grains of each port are replicated in space to create n×G inputs to n muxes. Each mux, therefore has the entire input available for selection at each clock tick. No routing algorithm is required since this is essentially an N×N solution.

U.S. Pat. No. 5,469,154 solves the problem using a variation on a 3-stage Clos network with 2× speedup. A simple routing algorithm is presented that while effective has only probabilistic guarantees and no guarantees on running time. For difficult routing problems, the algorithm may require an unbounded amount of time. As well as having no guarantee of success and unbounded running time, this architecture is rearranging.

Multicast is required in TDM data networks for a variety of reasons that can generally be described as data protection and signal distribution. In the case of data protection, this may consist of equipment protection where a vendor wants to provide redundant hardware in the case of the failure of a portion of the equipment. For example, while one line card may suffer a failure or be taken out of service for upgrade or repair, a second redundant line card may then be used to carry the traffic originally on the out-of-service line card. In some cases, the switch to the redundant equipment may be performed automatically based on signal quality. Typically, network operators want as little constraint as possible on protection arrangements. While it may be possible to construct simpler switches using known port placement, such constraints are typically hard to satisfy in the real world with real data connections and service agreements. Network providers typically want the flexibility to multicast data for protection from any port and timeslot to any port and timeslot.

Signal distribution multicast occurs when a single data signal is multicast to several destinations. This can be done when the original data itself is part of richer data connection than typical point-to-point connections, for example a multi-party conference call or the distribution of a video signal to multiple terminals. Typically there is no way to predict where the endpoints of such signal distribution will be. In this case, there is no easy solution other than to provide non-blocking multicast.

The growth of data networking has driven the need for high-capacity data switches. Typically the size of a switching system is limited by the ability to provide switching in a manageable form. Supporting connection rearrangement within a network of switching devices significantly increases the complexity of switch management and typically increases the time needed to respond to connection needs. Although multistage networks theoretically provide a means to create switches of unlimited size, the problem of managing large multistage networks sets a limit on practical size of such networks. Providing non-rearranging high capacity switch components simplifies the creation of such multistage networks and extends the boundary of what may be practically built and managed.

It is, therefore, desirable to provide non-rearrangeably non-blocking multicast with costs reduced from that of $n^2$ switch architectures without introducing expensive switch management algorithms.

SUMMARY OF THE INVENTION

It is an object of the present invention to obviate or mitigate at least one disadvantage of previous switch architectures.

In an embodiment, the present invention provides non-rearrangeably non-blocking multicast in a constant speedup of less cost than $n^2$ switch architectures for switches of useful sizes. In other words, in an embodiment, a switch architecture is provided that provides non-rearrangeably non-blocking multicast in a constant speedup with a simple switch-setting algorithm.

A Forward Propagation Architecture (FPA) scheme according to an embodiment of the present invention can be used to provide non-rearranging non-blocking multicast anywhere switching is required. Typically, the FPA is most attractive with high bandwidth devices as the basis for switch devices, although many devices provide switching with other functionality. For example, a multi-channel interface device may wish to provide switching as well as a simple interface.

In a first aspect, the present invention provides a time division multiplexed (TDM) switch including: an input stage for receiving a current grain group; an output stage for delivering a previous grain group to a data output; and a recirculation stage, in communication with the output stage, for recirculating a multicast grain from an output stage output to an output stage input for delivery at a later time to the data output, providing strictly non-blocking multicast. The delivery at a later time can be a later delivery within the grain group being processed.

The recirculation stage can include a plurality of recirculation multiplexers, and can further include a recirculation multiplexer control for controlling the recirculation multiplexers in response to recirculation multiplexer settings. The recirculation multiplexer settings can be based on parameters of the multicast grain delivery. The recirculation stage can include 2n−1 recirculation multiplexers, where n is an integer representing a number of ports in the TDM switch.

The input stage can include input memory and a plurality of input multiplexers. The input memory can include a plurality of random access memories (RAMs), for example 2n−1 RAMs, where n is an integer representing a number of ports in the TDM switch. The plurality of input multiplexers can be equal in number to the plurality of RAMs. The input stage can include 2n−1 input multiplexers, where n is an integer representing a number of ports in the TDM switch. The input memory can include latches. When the recirculation stage includes a plurality of recirculation multiplexers, the input multiplexers can be equal in size to the recirculation multiplexers. The switch can further include an input multiplexer control for controlling the input multiplexers in response to input multiplexer settings. The input stage can include an input fanout bus for delivering a signal to appropriate input multiplexers substantially simultaneously. The input stage can include an input storage array.

The output stage can include output memory and a plurality of output multiplexers. The output memory can include a plurality of random access memories (RAMs), for example 2n−1 RAMs, where n is an integer representing a number of ports in the TDM switch. The output stage can include n output multiplexers, where n is an integer representing a number of ports in the TDM switch. The output memory can include latches. The switch can further include an output multiplexer control for controlling the output multiplexers in response to output multiplexer settings, which settings can be based on parameters of the multicast grain delivery. The switch can further include output buffers, in communication with the output multiplexers, for buffering output grains for subsequent grain times. An output buffer width of the output buffers can be equal to an output multiplexer width of the output multiplexers. The output stage can include an output fanout bus for presenting a signal to appropriate output multiplexers and recirculation multiplexers substantially simultaneously.

In terms of implementation as a TDM switch, embodiments of the present invention can include means for receiving the current grain group and delivering the previous grain group during a single system cycle. The TDM switch can include means for reading and/or writing a plurality of bytes during a single system cycle.

In another aspect, there is provided a method of time division multiplexed (TDM) switching including the following steps: receiving a current grain group at an input stage; delivering a previous grain group to a data output at an output stage; and recirculating a multicast grain from an output stage output to an output stage input for delivery at a later time to the data output, providing strictly non-blocking multicast. The step of recirculating can be performed in response to recirculation settings, and the recirculation settings can be based on parameters of the multicast grain delivery. The steps of receiving the current grain group and delivering the previous grain group can be performed during a single system cycle. The steps of receiving the current grain group and delivering the previous grain group can include reading and/or writing a plurality of bytes during a single system cycle.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 6 illustrates a schedule of RAM #1 with connection 1:(A1→B2,C3);

FIG. 7 illustrates the rearrangement required to add 3:(C1→D1) to the schedule of FIG. 6;

FIG. 11 shows pseudocode to search ping RAM according to an embodiment of the present invention;

FIG. 12 shows pseudocode to search pong RAM according to an embodiment of the present invention;

FIG. 13 shows pseudocode to add a call according to an embodiment of the present invention.

DETAILED DESCRIPTION

Figure 1:
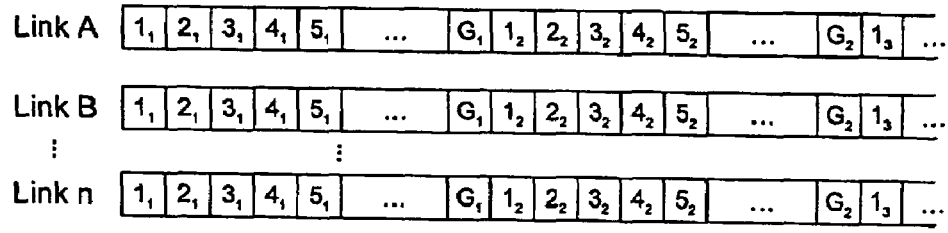
FIG. 1 is a graphical view of aligned TDM channels ready for switching.
Figure 2:
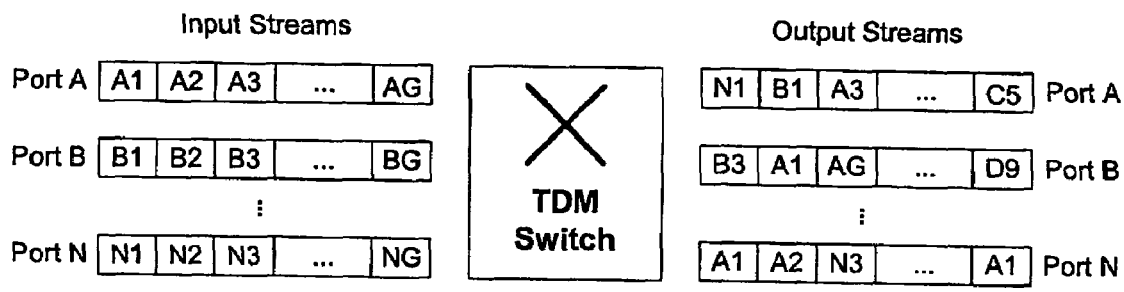
FIG. 2 is a graphical view of a problem of TDM switching.
Figure 3:
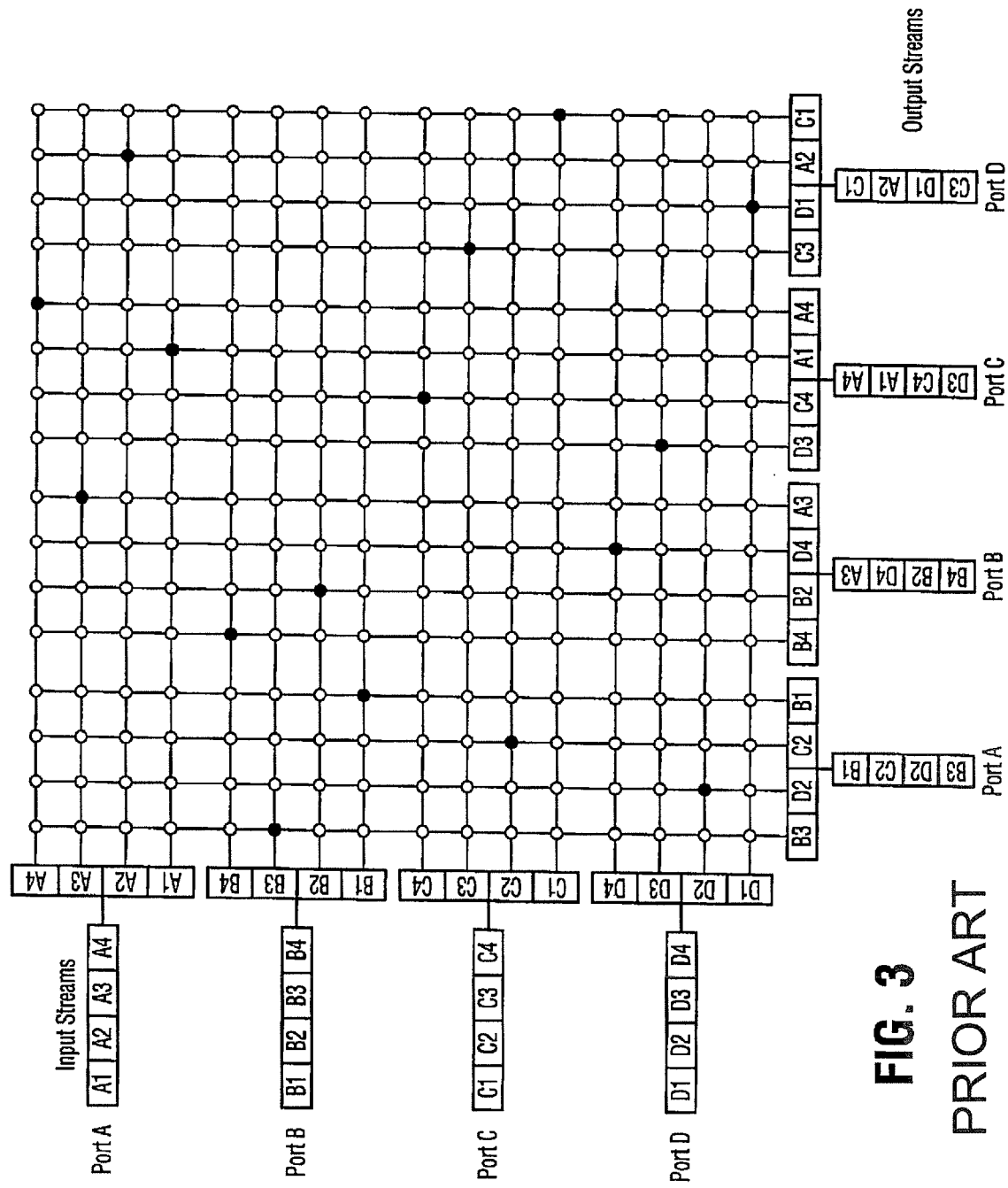
FIG. 3 illustrates an $n^2$ architecture of a four-port switch.
Figure 4:
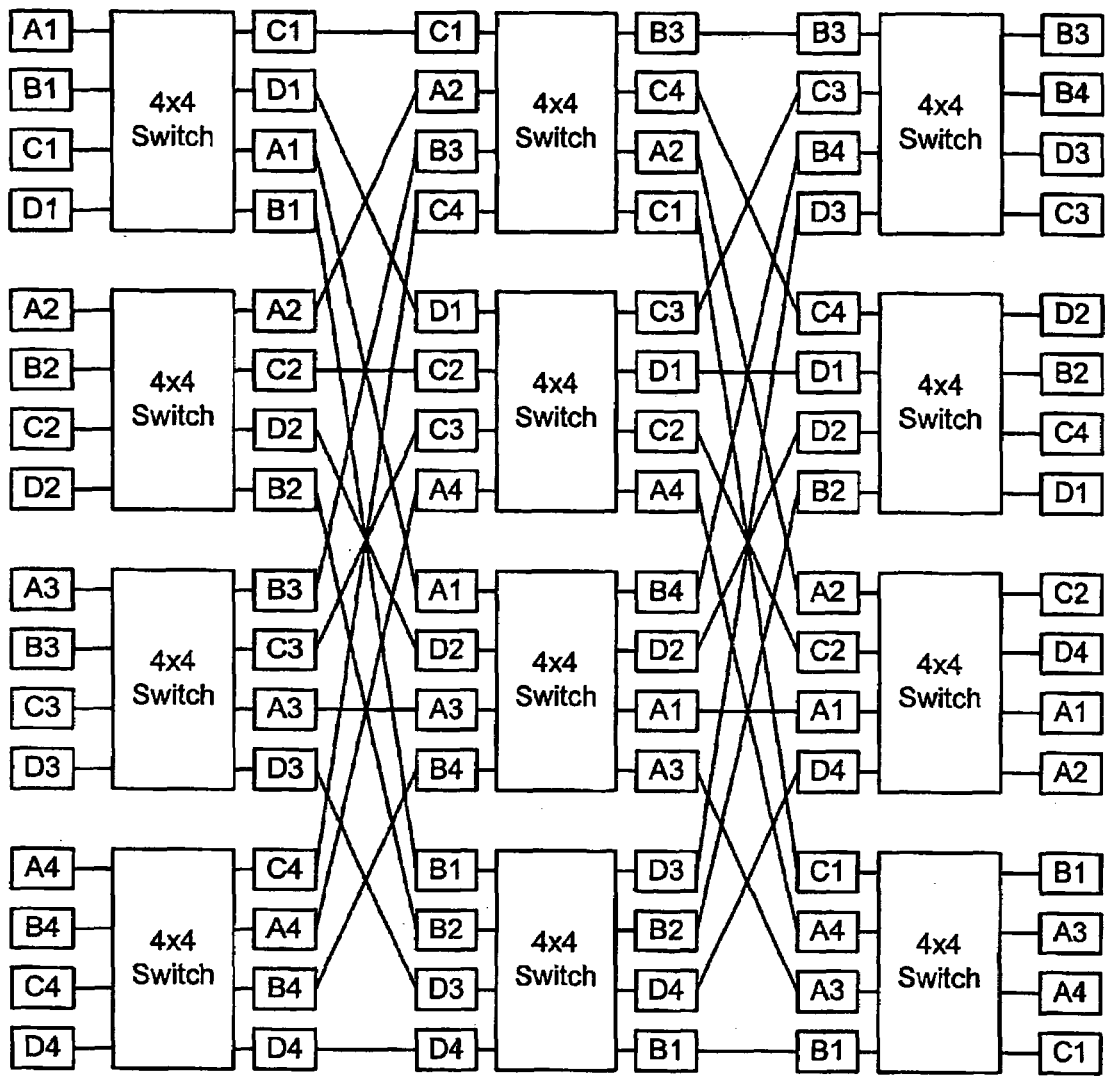
FIG. 4 illustrates an example Clos switch with n=m=r=4.

Generally, the present invention provides a switch architecture based on well-known unicast switching architectures, which provides two desirable properties: (1) no rearrangement of established calls is required and (2) the architecture is strictly non-blocking for multicast, even when multicast destinations are dynamically added to existing calls. These properties (excluding dynamic multicast destination addition) can be provided by standard architectures or Time:Space:Time architectures with speedup proportional to the width of the widest multicast to be supported. The speedup required by the FPA is constant and practical (approximately 4× speedup) and at significantly less hardware cost than $n^2$ architectures. The key to the FPA's capability is a sequentially doubled fabric with a feedback loop. The FPA requires a routing algorithm for connection setting. The connection-setting algorithm is sufficiently simple to be implemented in hardware.

With respect to terms used in this description, "blocking" occurs when a connection is made that can exclude the possibility of certain other connections being made. A switch is said to be "non-blocking" if any new connection request within the capacity of all input and output ports can be satisfied by the switch. A switch is said to be "wide sense non-blocking" when a particular connection rule must be applied in order to achieve a state in which a new connection can always be made. A switch is said to be "strict sense non-blocking" or "strictly non-blocking" when any connection rule will can be applied to achieve a state in which a new connection can always be made without disturbing the existing connections. A switch is said to be "rearrangeably non-blocking" when a new connection can be made, but it might be necessary to reconfigure some other connections on the switch. A "leaf" is a terminal or bottom item of a tree, i.e., an item with no child; more formally, a leaf is a vertex with degree one, and can also be referred to as an external node, or as a terminal node.

Embodiments of the present invention make use of a property provided by Space:Time:Space switches. Since time rearrangement is only done in the center stage of a Space: Time:Space switch, individual grains are delivered to output ports as they are needed. An input stage provides the ability to write to any arbitrary RAM and timeslot, e.g. in timeslot 47, you can write to RAM address 3. An output stage provides the ability to read from any RAM but that RAM can only be read at the RAM address corresponding to the current timeslot, e.g. at timeslot 47, you have to read from the $47^{th}$ RAM address. Hardware and/or software can be provided to arbitrate the reads and writes between the input stage and the output stage. Embodiments of the present invention introduce a recirculation loop to take advantage of this property. Multicast is implemented in a manner similar to linked lists: when a grain of multicast is presented for output, it is also recirculated back into the switch for delivery at a later time (as needed).

Figure 9:
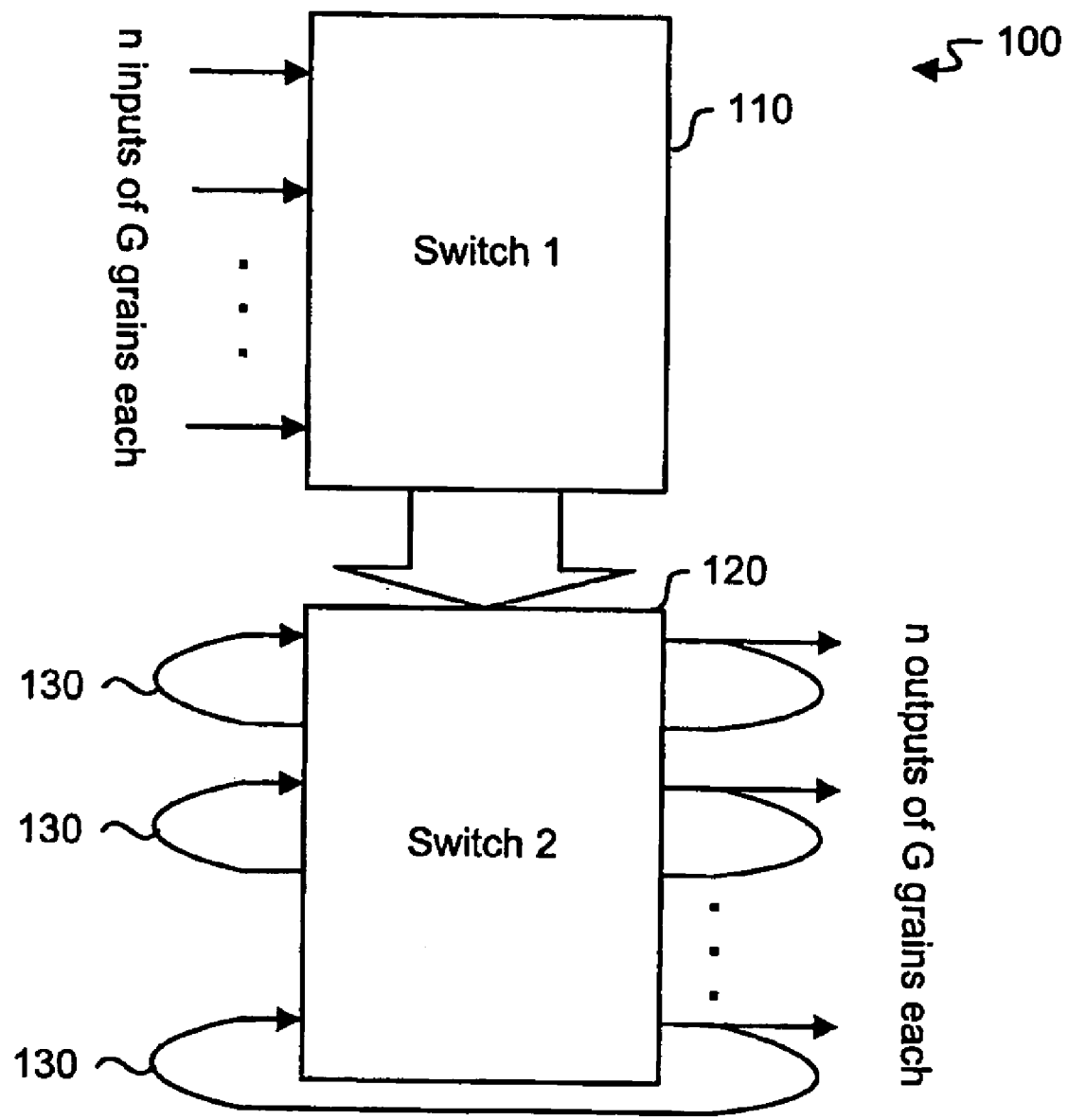
FIG. 9 is a simplified architectural view of an embodiment of the present invention.

FIG. 9 is a simplified architectural view of an embodiment of the present invention. This embodiment can be implemented as a TDM switch 100. Each input port is a TDM channel of G grains. In any such switch, at least G grains must be received on every port before any grain may be output because the last grain of a grain group to arrive may need to be output in the first grain position after switching. When the last of the G grains has arrived, the entire switch state is copied to an output stage 120, such as an output switch, for output and multicast processing while an input stage 110, such an input switch, begins receiving the next G grains.

Figure 5:
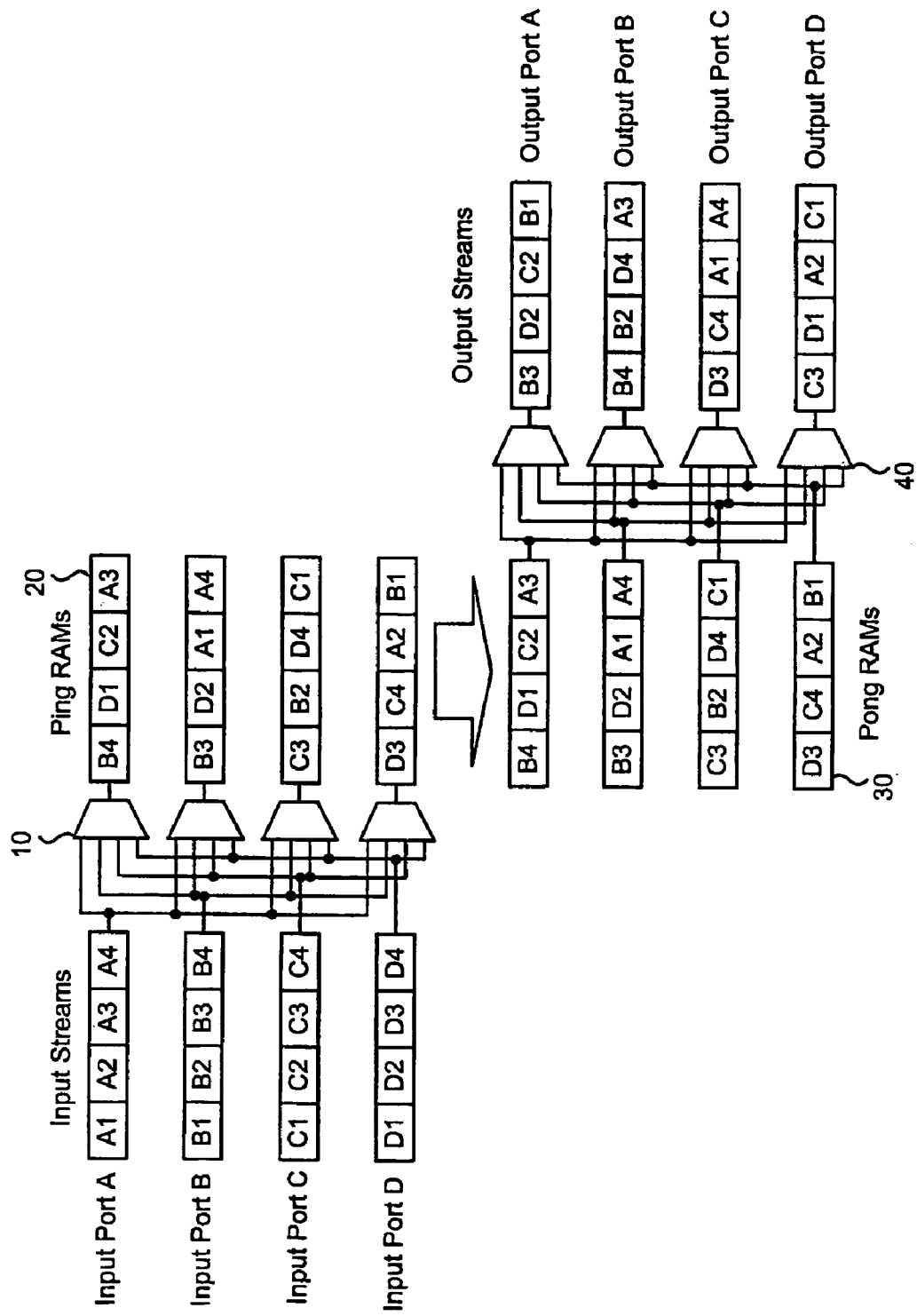
FIG. 5 illustrates an example Space:Time:Space switch.
Figure 8:
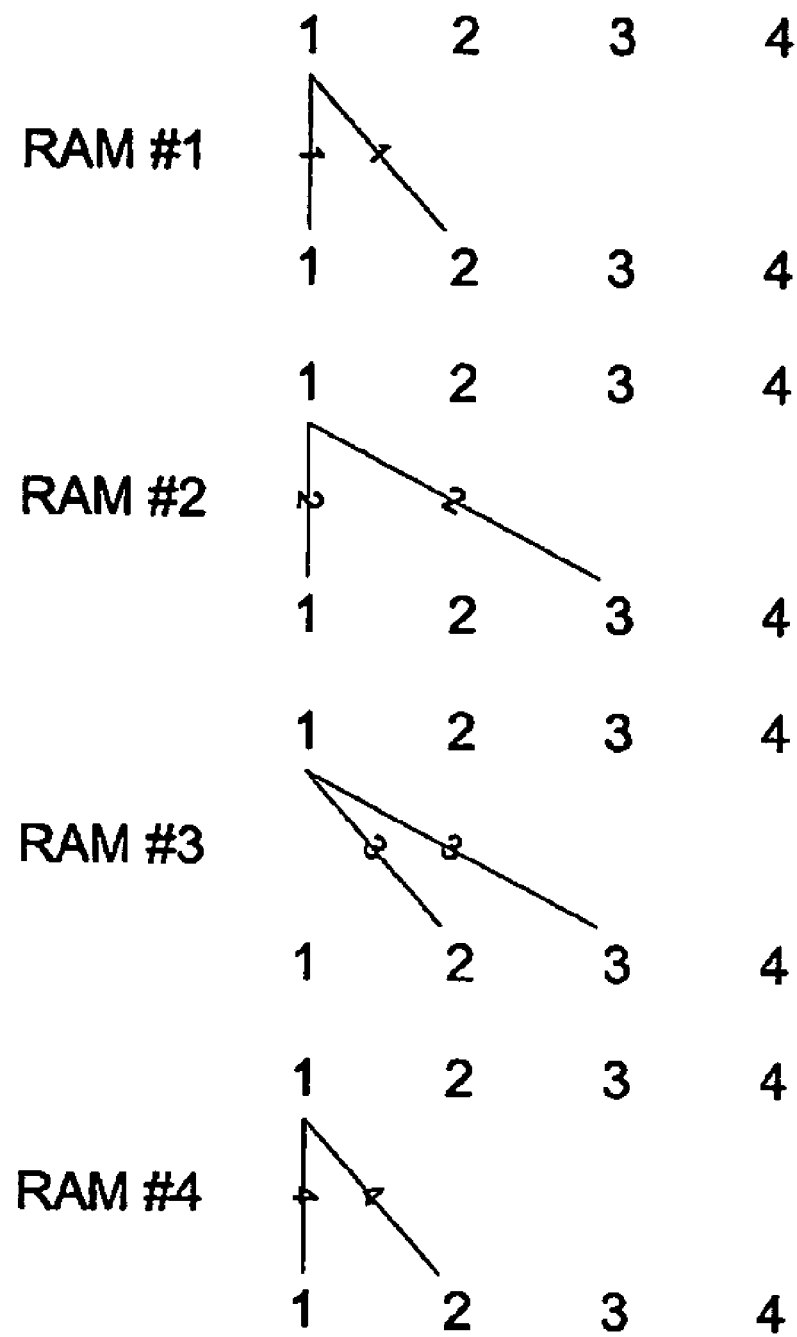
FIG. 8 illustrates conflicting multicast connections.

Conceptually, this architecture is similar to the Space: Time:Space fabric of FIG. 5 with the addition of the ability to feed the output back to the input of the second switch. The central idea is to use a feedback loop or recirculation stage 130 to recirculate multicast grains for later delivery within a grain group. The "Forward Propagation" of the Forward Propagation Architecture (FPA) denotes this feedback loop allowing propagation of multicast grains for later grain delivery times.

Figure 10:
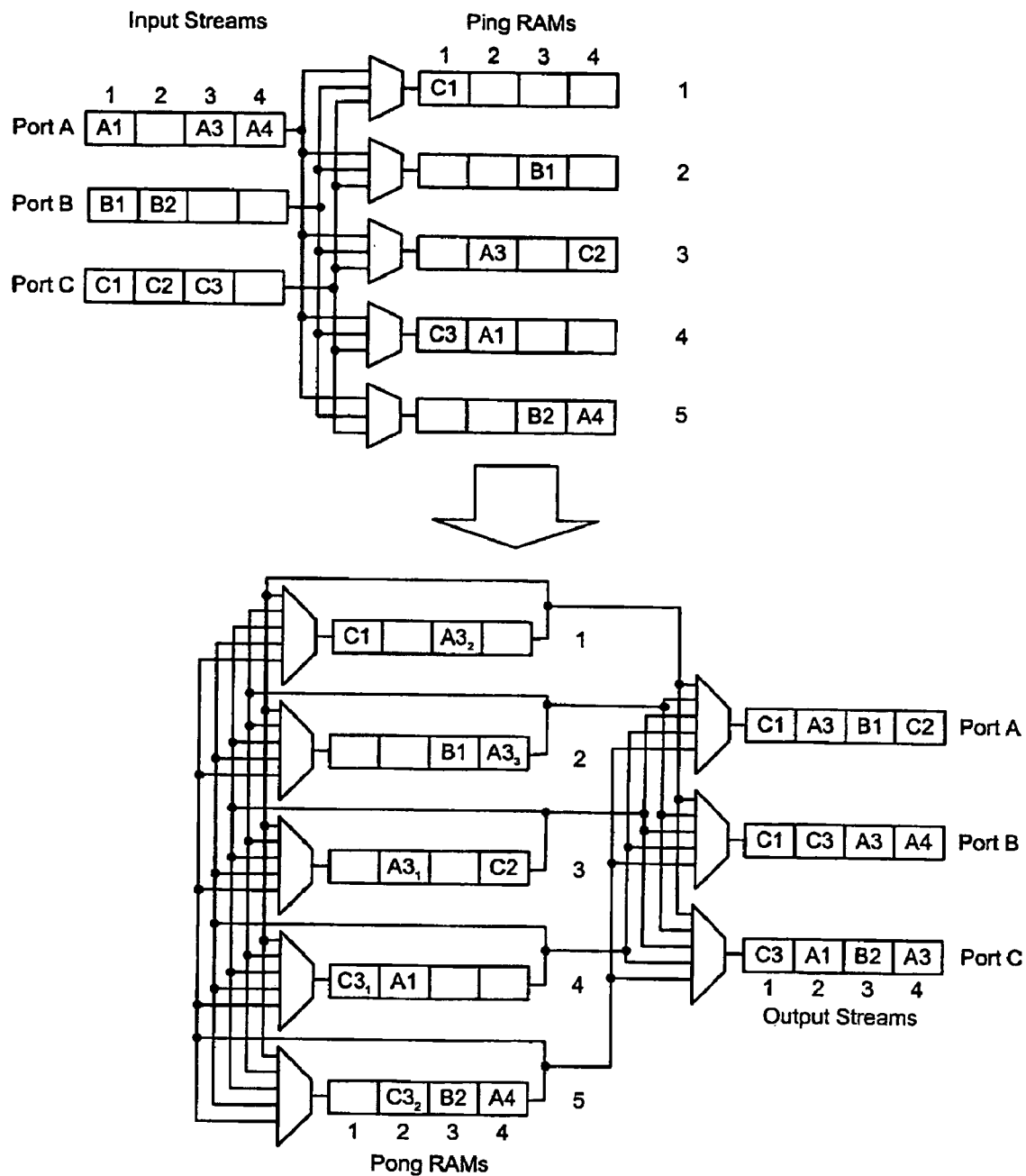
FIG. 10 shows an exemplary RAM-based FPA switch according to an embodiment of the present invention based upon a Space:Time:Space architecture with 2n−1 speedup.

FIG. 10 shows an exemplary RAM-based FPA switch based upon the Space:Time:Space architecture discussed above with 2n–1 speedup. The example of FIG. 10 is shown as a Space:Time:Space implementation with scheduled traffic. Two space switches are used: the first loads the ping RAMs with the grain group currently being received. The second space switch delivers the previous grain group to the output as well as recirculates multicast grains for subsequent delivery.

In the diagram, the grain group size is 4. There are 3 input ports of 4 grains each. The ports are labelled A, B and C. The grain positions are labelled across the top of Port A as grain group positions 1 through 4. There are five ping RAMs (twice 3 minus 1) labelled 1 through 5 to the right of the RAMs. Each RAM has four addresses labelled 1 through 4 across the top of RAM 1. Similarly, there are five pong RAMs labelled 1 through 5 to the right of the RAMs and the grain positions 1 through 4 are labelled across the bottom of RAM 5. There are also 3 output ports labelled A, B and C each with four grain group positions labelled across the bottom of Port C. It should be noted that the input stream appears aligned as a single column of grains at any particular grain time. An entire grain group is shown to assist in clearly illustrating the operation of the switch. In practical implementation and observation, the ping and pong RAMs do not typically consist of four locations as shown. Likewise the outputs are a stream of bytes and at any one time only a single column of grains exist.

Input ports should be aligned and synchronized so that grains arrive in parallel at each grain time. Each grain is written into a ping RAM at the address of its first output time. The 2n–1 ping RAMs are fed by the muxes from the inputs. The strictly non-blocking nature of a 2n–1 speedup guarantees that a RAM can always be found for an input grain.

The ping RAMs are shown as separate from the pong RAMs to make the operation of the two phases of switching obvious. An implementation might use the same RAM for both the ping and pong phase, but change the role of each RAM based on whether the RAM was being loaded from the input or being fed to the output. In any case, two sets of RAM suffice. For simplicity, the RAMs being fed from input are called ping RAMs and the RAMs being read for output are called pong RAMs without regard to implementation.

The pong RAMs feed the outputs and recirculate any multicast grains to be delivered at different (and later) times. The pong RAMs are read by the output muxes sequentially through all G addresses. If at an address a pong RAM has a grain for output, that output may also be written back into the pong RAM using the recirculation muxes for a later delivery in this grain group. The pong RAMs are written by the recirculation muxes always at a RAM address greater than the address being read for output. Any grain may be recirculated from any RAM to any RAM just as any grain may be output on any port.

If a grain is a unicast connection, the first grain time is the only time the grain is needed for output. If the grain is part of a multicast connection, then when the first grain time arrives the grain is fed both to the output and back to an available RAM where it is stored at the grain time of the next delivery. This can be seen, for example, with grain A3: first written to RAM #3 grain time 2 to be delivered to Port A and recirculated to RAM #1 grain time 3. The subscripts in the pong RAM of FIG. 10 denote bytes that are recirculated and the order of recirculation. Multicast grain C1 needs no recirculation because both receiving outputs receive C1 at the same time (grain time 1).

This implementation of the FPA has several desirable properties.

1. A ping RAM is always available for input given loads of 100% or less. The input discipline requires writing a grain at the RAM location of its first delivery. Using reasoning similar to the non-blocking proof of 2n–1 speedup, at most 2n–2 RAMs can be unavailable for writing at any grain time: n–1 for concurrent inputs and n–1 for other grains output at the same time. Therefore a ping RAM must be available and a simple search through all RAMs will find it.

2. A pong RAM is always available for recirculation of a multicast grain. At most n–1 other grains can be recirculated at the same time while any grain time can have at most n–1 entries across all RAMs since that represents full delivery to the other ports in the system. Therefore 2n–1 speedup guarantees an available pong.

The first property guarantees that a ping RAM can be found for every input grain while the second property guarantees that a pong RAM can be found for every recirculated grain with another simple search. No rearrangement of other calls is ever required. These two properties prove the multicast capability of the switch.

To summarize, an embodiment of the present invention provides a time division multiplexed (TDM) switch including: an input stage for receiving a current grain group; an output stage for delivering a previous grain group to a data output; and a recirculation stage, in communication with the output stage, for recirculating a multicast grain from an output stage output to an output stage input for delivery at a later time to the data output, providing strictly non-blocking multicast. The delivery at a later time can be a later delivery within the grain group being processed.

The recirculation stage can include a plurality of recirculation multiplexers, and can further include a recirculation multiplexer control for controlling the recirculation multiplexers in response to recirculation multiplexer settings. The recirculation multiplexer settings can be based on parameters of the multicast grain delivery. The recirculation stage can include 2n−1 recirculation multiplexers, where n is an integer representing a number of ports in the TDM switch.

The input stage can include input memory and a plurality of input multiplexers. The input memory can include a plurality of random access memories (RAMs), for example 2n−1 RAMs, where n is an integer representing a number of ports in the TDM switch. The plurality of input multiplexers can be equal in number to the plurality of RAMs. The input stage can include 2n−1 input multiplexers, where n is an integer representing a number of ports in the TDM switch. The input memory can include latches. When the recirculation stage includes a plurality of recirculation multiplexers, the input multiplexers can be equal in size to the recirculation multiplexers. The switch can further include an input multiplexer control for controlling the input multiplexers in response to input multiplexer settings. The input stage can include an input fanout bus for delivering a signal to appropriate input multiplexers substantially simultaneously. The input stage can include an input storage array.

The output stage can include output memory and a plurality of output multiplexers. The output memory can include a plurality of random access memories (RAMs), for example 2n−1 RAMs, where n is an integer representing a number of ports in the TDM switch. The output stage can include n output multiplexers, where n is an integer representing a number of ports in the TDM switch. The output memory can include latches. The switch can further include an output multiplexer control for controlling the output multiplexers in response to output multiplexer settings, which settings can be based on parameters of the multicast grain delivery. The switch can further include output buffers, in communication with the output multiplexers, for buffering output grains for subsequent grain times. An output buffer width of the output buffers can be equal to an output multiplexer width of the output multiplexers. The output stage can include an output fanout bus for presenting a signal to appropriate output multiplexers and recirculation multiplexers substantially simultaneously.

In terms of implementation as a TDM switch, embodiments of the present invention can include means for receiving the current grain group and delivering the previous grain group during a single system cycle. The TDM switch can include means for reading and/or writing a plurality of bytes during a single system cycle.

Embodiments of the present invention can also be described in relation to a method. Therefore, in an aspect, there is provided a method of time division multiplexed (TDM) switching including the following steps: receiving a current grain group at an input stage; delivering a previous grain group to a data output at an output stage; and recirculating a multicast grain from an output stage output to an output stage input for delivery at a later time to the data output, providing strictly non-blocking multicast. The step of recirculating can be performed in response to recirculation settings, and the recirculation settings can be based on parameters of the multicast grain delivery. The steps of receiving the current grain group and delivering the previous grain group can be performed during a single system cycle. The steps of receiving the current grain group and delivering the previous grain group can include reading and/or writing a plurality of bytes during a single system cycle.

Pseudocode for implementing some steps in conjunction with embodiments of the present invention are shown in FIG. 11, FIG. 12 and FIG. 13. The pseudocode is illustrative of examples of methods of searching for searching ping and pong RAM and adding a new call that can be used in conjunction with an architecture provided by embodiments of the present invention. However, it is to be understood that other methods of performing these functions could be alternatively used, and that these are shown only as examples of a particular implementation, since they are not inherent to embodiments of the present invention.

FIG. 11 shows pseudocode to search ping RAM. The pseudocode in FIG. 11 shows the search of the ping RAM. The parameter inputTime is the time that a call is input. The outputTime is the first output for a call. The function RAMisFree checks whether RAM i is available at the grain time outputTime. The function PingInputMuxIsFree checks whether ping input mux i is available to write to RAM i during grain time inputTime. Every call has at least one output time. linearSearchPingRam looks at every RAM for a ram that has not been used at the outputTime and a RAM that is free to accept a grain during the inputTime. If n is the number of ports and there are 2n−1 RAMs, then there must be at least one RAM free to accept this input.

FIG. 12 shows pseudocode to search pong RAM. The pseudocode in FIG. 12 shows the search of the pong RAM. The parameter prevTime is the time of delivery of a previous leaf of a multicast connection (either the first output grain time or any but the last output grain time since the last has no following leaf). The newTime is the output time of the leaf following the previous leaf (either the second output time up to the last output time). This search is only required for multicast calls. linearSearchPongRam looks at every RAM for a RAM that has not been used at the newTime and a RAM that is free to accept a recirculated grain during the prevTime. If n is the number of ports and there are 2n−1 RAMs, then there must be at least one RAM free to accept this recirculated grain.

FIG. 13 shows pseudocode to add a new call. The parameter call is a record storing necessary data related to a call. call.inputTime is the grain time the call arrives at the switch. call.outputTime is an array of times the call must be output. call.outputPort are the corresponding output ports. For any index i from 1 to call.maxOutput, call.outputPort[i] and call.outputTime[i] describe the output port and output grain time of call endpoint (or leaf) i. Call endpoints are sorted in ascending grain time order so that call.outputTime[i]≦call.outputTime[i+1]. call.ram[i] stores the index of the ram used to store the endpoint i of the call.

ram is a two dimensional array where ram[i,j] stores the call endpoint that is scheduled to occupy RAM i at address j regardless of whether that RAM location is written by the ping input muxes or the pong recirculation muxes. The array pingInputMux[i,j] stores the mux setting for ping input mux i at grain time j. The array pongOutputMux[i,j] stores the mux setting for the pong output mux i at grain time j. The array pongRecircMux[i,j] stores the mux setting for the pong recirculation mux i at grain time j.

The call input time and first output time are used to search the ping RAM. The available ping RAM that is returned by the search is stored in the RAM field of the call record so that when the call is disconnected or modified the RAM may be easily located. When the RAM is determined, the associated input mux of the RAM is set to receive from the input port at the input time. The RAM location to be written is the time of the first output. The pong output mux is also set to receive from the RAM location chosen to store the call. A while loop then handles any multicast endpoints or leaves that the call might have.

The while loop is executed for each leaf after the first of a multicast call. If the next leaf to be processed is delivered at the same time as the immediately previously scheduled leaf (as when two or more output ports receive the same grain at the same time), then that following leaf can be delivered from the same RAM position as the previous leaf since it is already present at the needed output time. If the leaf has a different output time, then the search of the pong RAM determines an available RAM to recirculate the grain to. The pong RAM is a copy of the ping RAM before recirculation, and similar to the search of the ping RAM above, the pong RAM chosen to receive the recirculated grain is stored in the call record with the same index as the index of the leaf being processed. The pong recirculation mux is set to select from the previous leaf's RAM during the previous output time, and the new RAM location is marked as used. The output mux is then set to select from the new RAM location during the new output time.

The primary difference between searching ping RAM and searching pong RAM is that when writing to ping RAM the ping input mux can only receive from one port while when writing to pong RAM it is the recirculation mux that can only receive from one RAM. RAM locations, however, must be respected between both ping and pong RAM. For example, if a call is input to a RAM location, that RAM location cannot be overwritten in pong RAM via a recirculation mux since the call leaf overwritten would be lost. Likewise, if a call recirculates to a RAM location in the pong RAM, then a subsequently input call cannot write to the same location since the call written by the ping mux would be lost. For these reasons, when either ping RAM or pong RAM is searched, any used RAM location whether it is used in ping or pong RAM is unavailable for use. Dynamic growth of multicast connections is also possible.

If a multicast leaf is added to a connection, then the new leaf's grain time determines how the add is implemented:

If the grain time is before all other leaves' grain times, then the input grain must be changed to write to an available ping RAM at the new grain time. Since the old first output time must now be recirculated from the new first output time, the pong RAM must be searched for a RAM location that may receive recirculation during the new first output time. While the call may be able to remain in the RAM it was placed in, if the recirculation mux of the original RAM is busy at the new first output time, then the old first leaf must be moved to a RAM that is free at the old first output time and also free to be written through the recirculation mux at the new first leaf time.

If the new leaf's grain time is the same as an existing grain time, then the output muxes are set to deliver the grain to the new output port and all other RAM settings remain unchanged.

If the new leafs grain time is different from all previous leaves and not the first grain time, then the preceding and following grain times are found. The sequence of recirculation needs to be updated. A pong RAM is found for the new leaf's grain time. The preceding grain is then recirculated to the new leaf's pong RAM. Like the case of the new first leaf above, the recirculation mux of the following leaf's RAM may be busy at the new grain time in which case the pong RAM must be searched for a RAM that is available to be receive a recirculation grain at the new leaf time and is free to be written at the following output time.

Dynamic modification of a multicast connection has only minimal effect on the connection being modified (the leaf being added and perhaps the following leaf) and no effect on any other connections. The operation is analogous to the addition of an element in a sorted linked list.

A further desirable result of this capability is that there is no distinction between multicast and unicast: any unicast connection can become multicast with the addition of another destination using the same technique used for changing multicast. Likewise a multicast connection can shrink to unicast.

A key aspect of the FPA is that grains are written into memory at an address representing the timeslot for delivery for output. While the simplest representation of a grain time for delivery is the identity function (where grain time x is represented by memory address x), any lossless transformation of grain time into address would also suffice. The identity transformation can be given as $f(g)=g$ where g is the grain time or timeslot for delivery. An alternative function is $f(g)=G-g$ where G is the size of the grain group—although note that an alternative mapping will change the algorithm for grain placement for recirculation. Given the identity function, recirculated grains must be placed in sequentially greater memory addresses. Given the alternative mapping of $f(g)=G-g$, grains to be recirculated must be placed in sequentially lesser memory addresses. Any other lossless mapping function will affect the correct choice of memory locations for recirculation but will not change the essence of the technique or invention.

In other words, a method is provided for adding a new call in a TDM switch, including the following steps: searching input memory and identifying an available input random access memory (RAM) at a grain input time and a grain output time; setting an input multiplexer associated with the available input RAM to receive from an input port at the grain input time; writing an identification of the available input RAM at the time of first output; searching output memory and identifying an available output RAM at a first delivery time and a second delivery time; setting an output multiplexer to receive from the available input RAM. If the new call is a multicast call, for each leaf of the multicast call the following steps are performed: delivering a next leaf from the same RAM position as an immediately previous leaf if the next leaf to be processed is delivered at the same time as the immediately previous leaf; determining an available RAM to recirculate the grain to if the next leaf has a different output time; setting the output recirculation multiplexer to select from the previous leafs RAM during the previous output time, and marking the new RAM location as used; and setting the output multiplexer to select from the new RAM location during the new output time.

The step of searching the input memory and identifying the available input RAM can include the following steps: checking whether the input RAM is free to accept a grain during a grain input time; checking whether the input RAM is available at a grain output time; if the input RAM is available at the grain output time and is free to accept the grain during the grain input time, checking whether an input multiplexer associated with the input RAM is available to write to the input RAM during the grain input time; and making a positive determination with respect to the input RAM's availability for the grain delivery if the input multiplexer is available to write to the input RAM during the grain input time.

The step of searching the output memory and identifying the available output RAM can include the following steps: checking whether the output RAM is free to accept a grain during the first delivery time for a previous leaf of a multicast connection; checking whether the output RAM is available at a second delivery time for an earlier leaf, the earlier leaf following the previous leaf; if the output RAM is available at the second delivery time and is free to accept the grain during the first delivery time, checking whether a recirculation multiplexer associated with the output RAM is available to write to the output RAM during the first delivery time; and making a positive determination with respect to the output RAM's availability for the grain delivery if the recirculation multiplexer is available to write to the output RAM during the first delivery time.

The FPA can be used to provide non-rearranging non-blocking multicast anywhere switching is required. Typically, the FPA is most attractive with high bandwidth devices as the basis for switch devices, although many devices provide switching with other functionality. For example, a multichannel interface device may provide switching as well as interface functionality. Table 1 compares an exemplary FPA implementation with a strictly non-blocking unicast Space:Time:Space switch and an N×N switch in terms of complexity.

standard Clos network requires speedup proportional to the width of the multicast to be supported.

The attractiveness of the FPA depends on the architecture to be implemented. The FPA is approximately half the cost of an $n^2$ architecture for the first two architectures, and then significantly smaller for the final architecture. While $n^2$ architectures are sensitive to the number of grains, the FPA is less so since that will simply change the size of the RAMs without changing the number of muxes.

While the FPA represents a remarkable fabric for achieving strictly non-blocking multicast in a constant speedup over rearrangeably non-blocking unicast switches, the choice of an FPA architecture over an $n^2$ architecture is complicated by the requirement of an algorithm to determine switch settings—no algorithm is required for $n^2$ switches.

One challenge in implementing an FPA is the tight time bound on grain recirculation. Any number of standard techniques can be applied to soften the recirculation time bound. One approach is to buffer output grains for following grain times. If, for example the output muxes are doubled in width, then grains for delivery in the next grain time can be fed to the output from their saved buffer. So, in terms of a switch as described according to embodiments of the present invention, the output stage can include output buffers, in communication with the output multiplexers, for buffering output grains for

TABLE 1

| n | 16 | | | 64 | | | 16 | | |
|---|---|---|---|---|---|---|---|---|---|
| G | 12 | | | 48 | | | 1,080 | | |
| Grain size | 8 | | | 8 | | | 8 | | |
| | 2n-1 | FPA | NxN | 2n-1 | FPA | NxN | 2n-1 | FPA | NxN |
| RAM bits | 5,952 | 5,952 | 3,072 | 97,536 | 97,536 | 49,152 | 535,680 | 535,680 | 276,480 |
| Input Mux Width | 128 | 128 | | 512 | 512 | | 128 | 128 | |
| Input Mux Cost | 43 | 43 | | 171 | 171 | | 43 | 43 | |
| Input Mux Count | 31 | 31 | 1,536 | 31 | 31 | | 31 | 31 | |
| Output Mux Width | 248 | 248 | 512 | 1,060 | 1,060 | 24,576 | 248 | 248 | 138,240 |
| Output Mux Cost | 73 | 73 | 16 | 339 | 339 | 8,193 | 83 | 83 | 46,082 |
| Output Mux Count | 16 | 16 | 16 | 64 | 64 | 16 | 16 | 16 | 16 |
| Recirculation Mux Width | | 248 | | | 1,016 | | | 248 | |
| Recirculation Mux Cost | | 73 | | | 339 | | | 83 | |
| Recirculation Mux Count | | 31 | | | 127 | | | 31 | |
| Total 4:1 Muxes | 2,501 | 4,764 | 8,192 | 26,997 | 70,050 | 131,088 | 2,661 | 5,234 | 737,312 |

Table 1 provides a rough complexity comparison between FPA and other switch architectures for varying numbers of ports and grains. Two architectures are chosen for comparison:

1. A strictly non-blocking for unicast Space:Time:Space switch, the architecture on which the exemplary implementation of FPA is based. This architecture requires a 2n–1 speedup and its columns are labelled "2n–1"; and 2. An $n^2$ architecture implemented as output muxes from the input ports. Each input port must save a complete grain group, and then each output mux selects from all available inputs to feed the output. These columns are labelled "N×N".

For comparison, all muxes are constructed out of 4:1 mux trees in order to compare the cost of the different number of different size muxes. For example, a 16:1 mux would be implemented from a total of 5 4:1 muxes: 4 muxes to receive the 16 inputs plus a fifth mux to select from the output of the set of 4 muxes.

As can be seen, the primary cost of the FPA over the strictly non-blocking unicast Space:Time:Space is a doubling of the number of muxes. This is the approximate 4× speedup that provides non-blocking, non-rearranging multicast where a subsequent grain times, and the output buffer width can be equal to the output multiplexer width.

A second approach would be to gearbox the system to work on more than a single grain at a time. For example if three bytes are read and written during a system cycle, then the speed of writing or reading RAM can be slowed from the grain time by a factor of 3. So, in terms of a switch according to embodiments of the present invention, the switch can include means for reading and/or writing a plurality of bytes during a single system cycle. In terms of a method according to embodiments of the present invention, the steps of receiving the current grain group and delivering the previous grain group can include reading and/or writing a plurality of bytes during a single system cycle.

Different approaches could relax other aspects of the architecture, but care should be taken to preserve the important properties of the FPA. For example, if grains were always kept in the same pong RAM for later delivery, then the feedback loop could be eliminated. The problem with this simplification is that the switch is now rearranging and probably blocking: no known speedup of less than n (to produce an N×N architecture) is guaranteed to be able to schedule the multicast in single RAM.

Figure 14:
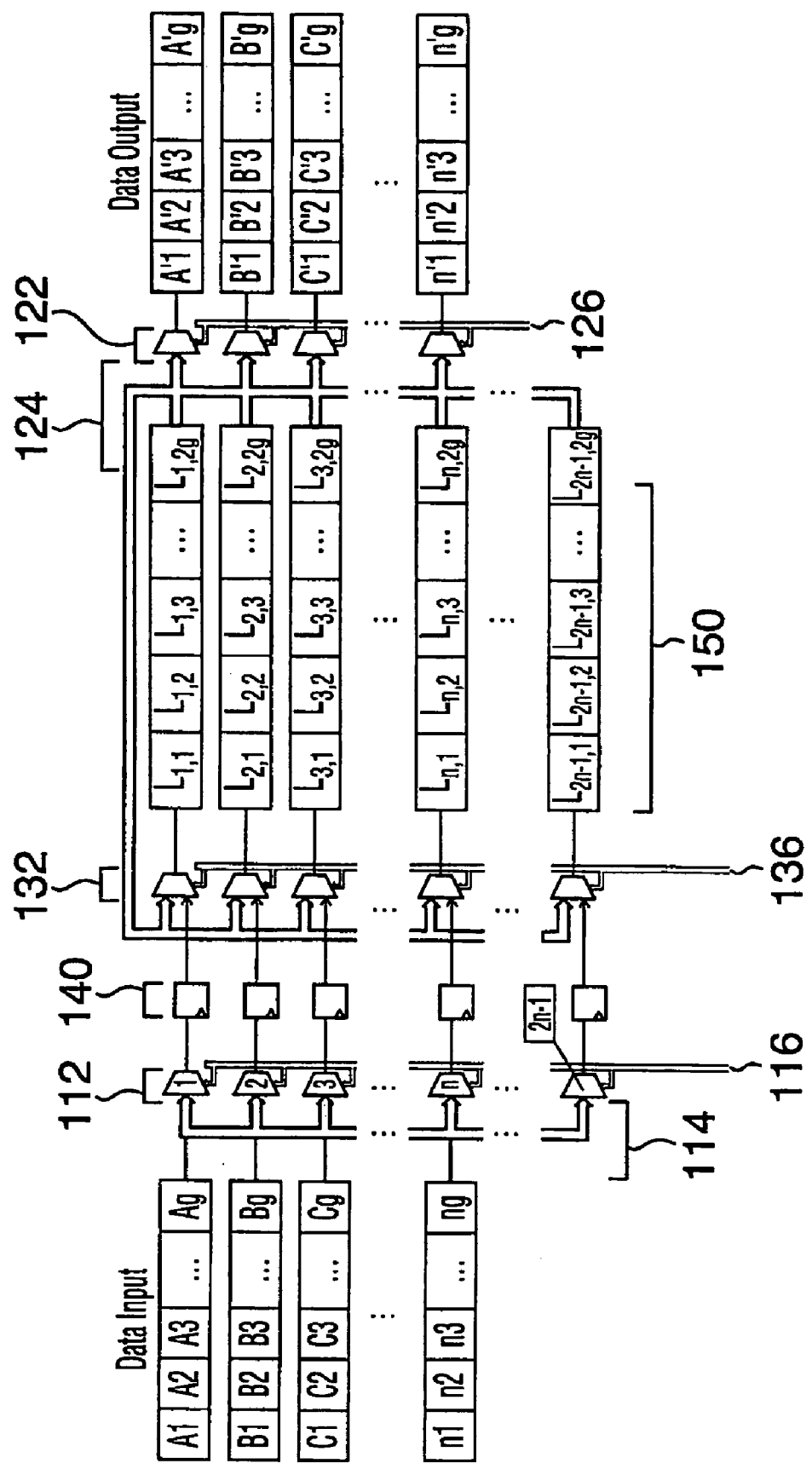
FIG. 14 illustrates a latch-based FPA implementation according to an embodiment of the present invention.

FIG. 14 illustrates a latch-based FPA implementation according to an embodiment of the present invention. This exemplary practical implementation strategy provides pong recirculation in a single grain time. This implementation is latch-based rather than RAM based to provide for quick recirculation of bytes. Latches are inherently faster than RAMs, such that it is possible to read out a current value and write it out in the same dock tick. In other words, embodiments of the present invention can include means for receiving the current grain group and delivering the previous grain group during a single system cycle. In terms of a method according to an embodiment of the present invention, the steps of receiving the current grain group and delivering the previous grain group can be performed during a single system cycle.

The implementation of an FPA fabric shown in FIG. 14 has n I/O ports and g 8-bit grains (i.e. a grain group size of g). During each cycle, one grain from each port is processed. Particular numbers of multiplexers, bits and latches are described with respect to this implementation, though other implementations with different numbers of elements are possible. In this implementation, an input stage fanout bus 114 is provided, such as a 1 to 2n–1 fanout for each incoming port. The purpose of the input stage fanout bus 114 is to deliver a signal to all the needed multiplexers. For example, for FIG. 10, the fanout is 1:5 for the input fanout bus since a single byte must be presented to 5 muxes for selection. This fanout 114 leads to input stage muxes 112. In the embodiment of FIG. 14. There are 2n–1 n:1 muxes, each of which processes 8 bits in parallel. The mux control settings, for implementing input stage mux control (shown diagrammatically as 116), typically employ $2*(2n-1)*g*\log_2(n)$ bits. Usually, two copies of this control data are required to allow for hitless switching. The output of the input muxes 112 is then stored in an array of flip-flops 140 before it fans out to the re-circulation mux stage. These flip-flops 140 are employed since the input and recirculation stages are not likely to be adjacent due to physical placement constraints on the logic cells.

In FIG. 14, There are 2n–1 re-circulation muxes 132. Each of these muxes must choose from n inputs (n re-circulated grains). The recirculation muxes 132 in this case are (2n):1 muxes, and they employ $2*(2n-1)*g*\log_2(2n-1)$ bits to store the mux settings. Recirculation stage control logic (shown diagrammatically as 136), or mux control, is also employed to select the correct half (ping or pong) of the time switch stage element. Again, usually two copies of this control data are required to allow for hitless switching. A time switch stage 150 is composed of 2n–1 groups of 2 g*8 latches. The use of latches allows for single cycle re-circulation of grains that are required later in the output schedule. When implemented with two sets of g latch memory elements, each set of latches can perform an independent simultaneous read/write access. Time switch stage settings are stored in $2*(2n-1)*2g*\log_2(g)$ bits. The read/write mechanism for the latches requires that 2 writes and a single read be allowed to proceed in parallel for each group of 2 g latches.

The output of the time switch stage 150 fans out to both the output muxes 122 and back to the re-circulation muxes 132. An output fanout bus 124 allows for a byte read from a RAM to be presented simultaneously to each of the output muxes and the recirculation muxes. For the implementation in FIG. 10, 8 muxes in total are provided, or a fanout of 1:8. Referring back to FIG. 14 and discussing the situation in general terms, the total fanout for each of the 2n–1 latch groups is 1:3n–1 (2n–1 re-circulation muxes 132 and n output muxes 122 for a total of 3n–1). The path to the output muxes 122 may have a flip-flop delay but the path from the latches through the recirculation muxes 132 and back to the latches must occur in one cycle. The final stage of output muxes 122 consists of n (2n–1):1 muxes each processing 8 bits in parallel. The output muxes typically employ $2n*g*\log_2(2n-1)$ bits to implement output mux control (shown diagrammatically as 126) to control the mux select lines. Again, usually two copies of this control data is required to allow for hitless switching.

A control memory controls the settings for the switch. At every timeslot, values are preferably set, indicating where the muxes should be reading or writing to. Similar control is applied to input, output, and recirculation muxes, as has been described above in relation to elements 116, 126 and 136, respectively, as well as to the memories. This control can all be implemented in a single storage element of sufficient size to handle all of the necessary information, or can be implemented in separate memories or control sections. One example is the storage element 140 of an 8 bit array of flip-flops, as shown in FIG. 14.

Although preferred embodiments have been described with particular numbers of multiplexers, RAMs and latches, it is to be understood that advantages can still be achieved according to embodiments of the present invention without using any speedup.

The implementation of the FPA is an alternative to other existing techniques such as Clos networks and $n^2$ switch architectures. The FPA increases the size of practical multicast capable TDM switches. The FPA disclosed herein can be implemented in a custom integrated circuit, as part of a larger integrated circuit or as multiple integrated circuits. The FPA represents a simple technique that can be used either to reduce the cost of switching components or to extend their size beyond what is capable with other multicast capable switch architectures.

For simplicity, only switches of the same number of input and output ports have been explicitly considered in this discussion but the invention can be easily extended to asymmetrical switches of various numbers of input and output ports. Similarly, switches are often homogenous in terms of grain size, but grain size also may vary per port.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A time division multiplexed (TDM) switch comprising:
   an input stage for receiving a current grain group;
   an output stage for delivering a previous grain group to a data output; and
   a recirculation stage, in communication with the output stage, for recirculating a multicast grain from an output stage output to an output stage input for delivery at a later time to the data output, providing strictly non-blocking multicast, the multicast grain being delivered to one output port at a first time and to another output port at the later time, the recirculation stage comprising exactly 2n–1 recirculation multiplexers, where n is an integer representing a number of ports in the TDM switch.

2. The TDM switch of claim 1 further comprising a recirculation multiplexer control for controlling the recirculation multiplexers in response to recirculation multiplexer settings.

3. The TDM switch of claim 1 wherein the recirculation multiplexer settings are based on parameters of the multicast grain delivery.

4. The TDM switch of claim 1 wherein the input stage comprises input memory and a plurality of input multiplexers.

5. The TDM switch of claim 4 wherein the input memory comprises a plurality of random access memories (RAMs).

6. The TDM switch of claim 5 wherein the input memory comprises exactly 2n–1 RAMs, where n is an integer representing a number of ports in the TDM switch.

7. The TDM switch of claim 5 wherein the plurality of input multiplexers is equal in number to the plurality of RAMs.

8. The TDM switch of claim 4 wherein the input stage comprises exactly 2n–1 input multiplexers, where n is an integer representing a number of ports in the TDM switch.

9. The TDM switch of claim 4 wherein the input memory comprises latches.

10. The TDM switch of claim 4 wherein the recirculation stage comprises a plurality of recirculation multiplexers, and the input multiplexers are equal in size to the recirculation multiplexers.

11. The TDM switch of claim 4 further comprising an input multiplexer control for controlling the input multiplexers in response to input multiplexer settings.

12. The TDM switch of claim 1 wherein the input stage comprises an input fanout bus for delivering a signal to appropriate input multiplexers substantially simultaneously.

13. The TDM switch of claim 1 wherein the input stage comprises an input storage array.

14. The TDM switch of claim 1 wherein the output stage comprises output memory and a plurality of output multiplexers.

15. The TDM switch of claim 14 wherein the output memory comprises a plurality of random access memories (RAMs).

16. The TDM switch of claim 15 wherein the output memory comprises exactly 2n–1 RAMs, where n is an integer representing a number of ports in the TDM switch.

17. The TDM switch of claim 14 wherein the output stage comprises n output multiplexers, where n is an integer representing a number of ports in the TDM switch.

18. The TDM switch of claim 14 wherein the output memory comprises latches.

19. The TDM switch of claim 14 further comprising an output multiplexer control for controlling the output multiplexers in response to output multiplexer settings.

20. The TDM switch of claim 19 wherein the output multiplexer settings are based on parameters of the multicast grain delivery.

21. The TDM switch of claim 14 further comprising output buffers, in communication with the output multiplexers, for buffering output grains for subsequent grain times.

22. The TDM switch of claim 21 wherein an output buffer width of the output buffers is equal to an output multiplexer width of the output multiplexers.

23. The TDM switch of claim 1 wherein the output stage comprises an output fanout bus for presenting a signal to appropriate output multiplexers and recirculation multiplexers substantially simultaneously.

24. The TDM switch of claim 1 wherein the delivery at a later time comprises later delivery within the grain group being processed.

25. The TDM switch of claim 1 further comprising means for receiving the current grain group and delivering the previous grain group during a single system cycle.

26. The TDM switch of claim 1 further comprising means for reading a plurality of bytes during a single system cycle.

27. The TDM switch of claim 1 wherein the recirculation stage recirculates the multicast grain for later delivery within a grain group.

28. The TDM switch of claim 1 further comprising means for writing a plurality of bytes during a single system cycle.

29. A method of time division multiplexed (TDM) switching comprising:
   receiving a current grain group at an input stage;
   delivering a previous grain group to a data output at an output stage; and
   recirculating a multicast grain from an output stage output to an output stage input for delivery at a later time to the data output, providing strictly non-blocking multicast, the multicast grain being delivered to one output port at a first time and to another output port at the later time, the step of recirculating occurring at a recirculation stage comprising exactly 2n–1 recirculation multiplexers, where n is an integer representing a number of ports in a TDM switch in which the recirculation occurs.

30. The method of claim 29 wherein the step of recirculating is performed in response to recirculation settings.

31. The method of claim 30 wherein the recirculation settings are based on parameters of the multicast grain delivery.

32. The method of claim 29 wherein the steps of receiving the current grain group and delivering the previous grain group are performed during a single system cycle.

33. The method of claim 29 wherein the steps of receiving the current grain group and delivering the previous grain group include reading a plurality of bytes during a single system cycle.

34. The method of claim 29 further comprising recirculating the multicast grain for later delivery within a grain group.

35. The method of claim 29 wherein the steps of receiving the current grain group and delivering the previous grain group include writing a plurality of bytes during a single system cycle.

* * * * *